(12) United States Patent
Buttridge et al.

(10) Patent No.: US 10,065,131 B2
(45) Date of Patent: Sep. 4, 2018

(54) LIQUID-GAS EXCHANGE DEVICE AND SEPARATION METHOD

(71) Applicant: GTI Solutions International LLC., Flower Mound, TX (US)

(72) Inventors: Ian Buttridge, Garland, TX (US); Naresh Thakur, Seoul (KR)

(73) Assignee: GTI Solutions International, LLC, Flower Mound, TX (US)

( * ) Notice: Subject to any disclaimer, the term of this patent is extended or adjusted under 35 U.S.C. 154(b) by 365 days.

(21) Appl. No.: 14/951,270

(22) Filed: Nov. 24, 2015

(65) Prior Publication Data
US 2016/0193542 A1    Jul. 7, 2016

Related U.S. Application Data

(60) Provisional application No. 62/084,481, filed on Nov. 25, 2014.

(51) Int. Cl.
*B01D 3/16*   (2006.01)
*B01D 3/18*   (2006.01)
*B01D 3/20*   (2006.01)

(52) U.S. Cl.
CPC ................................. *B01D 3/163* (2013.01)

(58) Field of Classification Search
CPC . B01D 3/163; B01D 3/16; B01D 3/18; B01D 3/20; B01D 3/205
See application file for complete search history.

(56) References Cited

U.S. PATENT DOCUMENTS 3,815,880 A * 6/1974 Price ............... B01D 3/163
261/114.4

* cited by examiner

*Primary Examiner* — Renee Robinson
*Assistant Examiner* — Derek N Mueller

(57) ABSTRACT

An exchange device includes a plate having a top surface, a bottom surface, a plurality of openings extending between the top and bottom surfaces. The top surface receives a liquid which flows in a flow direction over the top surface. A plurality of valves is disposed over the openings. Each valve includes a round lid coupled to the first, second, and third legs. The first leg is upstream of the second and third legs relative to the flow direction. The first leg has a width that is greater than the width of the second and third legs. In particular, a ratio of the width of the first leg to the width of the second leg is in a range of 1.6:1 to 2.6:1.

20 Claims, 4 Drawing Sheets

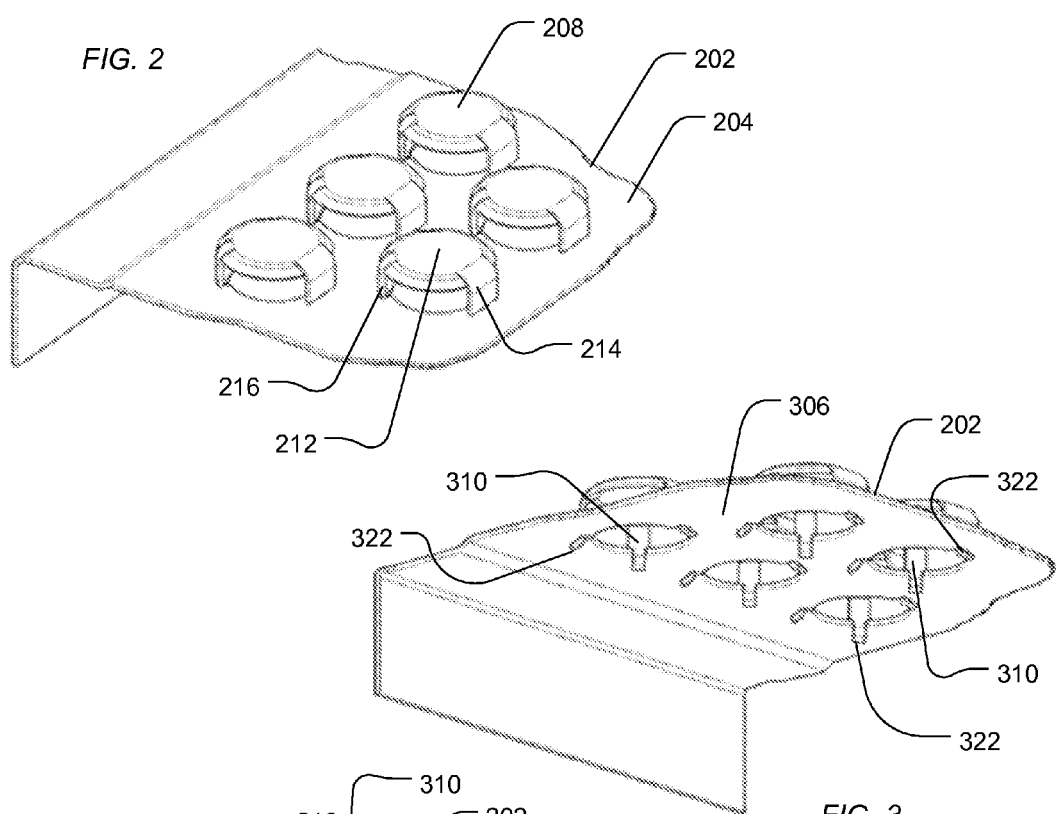
FIG. 2
FIG. 3
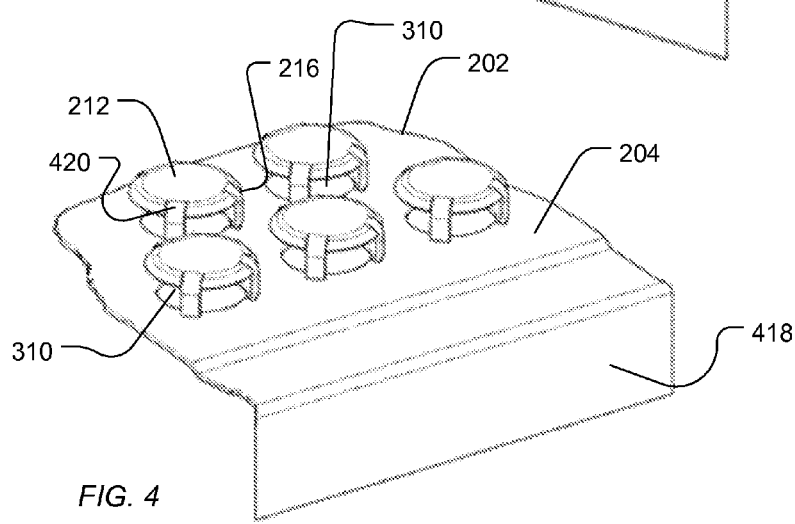
FIG. 4

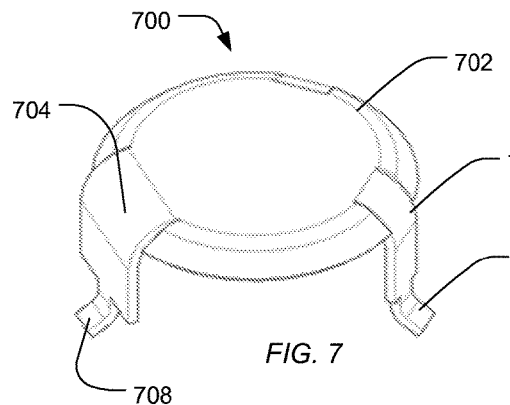
FIG. 7
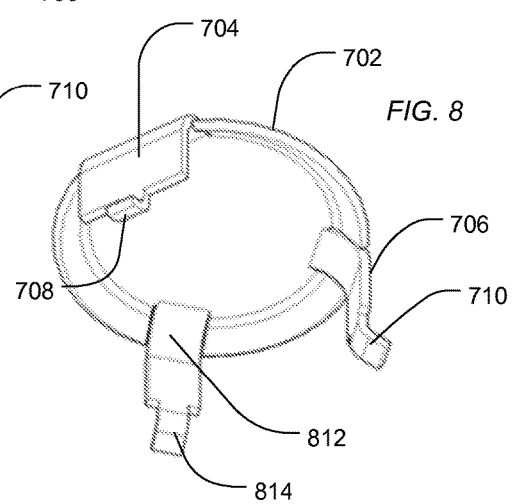
FIG. 8
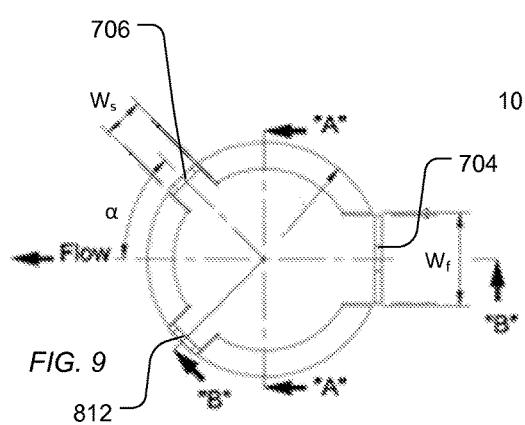
FIG. 9
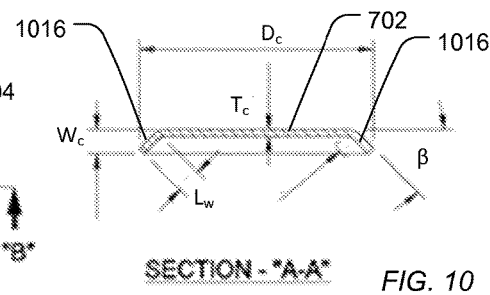
SECTION - "A-A"  FIG. 10
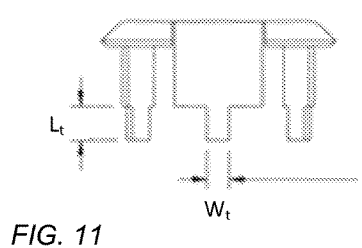
FIG. 11
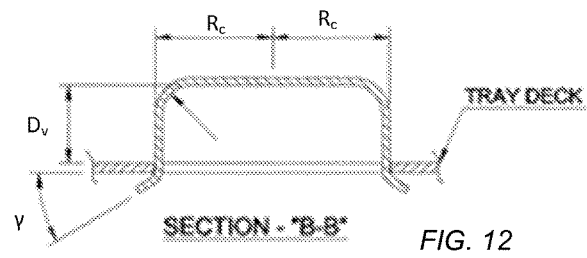
SECTION - "B-B"  FIG. 12

LIQUID-GAS EXCHANGE DEVICE AND SEPARATION METHOD

FIELD OF THE DISCLOSURE

This disclosure, in general, relates to liquid-gas exchange devices, columns including such liquid-gas exchange devices, and methods for using such columns.

BACKGROUND

In industry, various separation techniques are used to separate components from a multicomponent stream. Some separation technologies relying on liquid-gas exchange, such as distillation columns or absorption columns, utilize contact between liquid and gas streams to facilitate concentration of a desired component. The efficiency of such devices is, in part, dependent on the generation of contact surface area between the liquid and gas streams.

In an example, some columns utilize trays to facilitate liquid and gas contact, whereas other columns utilize packing to facilitate such liquid and gas contact. Exemplary trays include bubble cap trays, sieve trays, or valve trays, which in various structures facilitate the formation of bubbles in a stream of liquid flowing across the tray. However, various tray designs have suffered from issues associated with operability and ease of manufacturing.

As such, an improved exchange device would be desirable.

BRIEF DESCRIPTION OF THE DRAWINGS

The present disclosure may be better understood, and its numerous features and advantages made apparent to those skilled in the art by referencing the accompanying drawings.

FIG. 2, FIG. 3, FIG. 4, and FIG. 5 include illustrations of an exemplary tray or exchange device.

FIG. 7, FIG. 8, FIG. 9, FIG. 10, FIG. 11, and FIG. 12 include illustrations of exemplary valve designs.

The use of the same reference symbols in different drawings indicates similar or identical items.

DETAILED DESCRIPTION

In an exemplary embodiment, an exchange device includes a plate having a top surface, a bottom surface, a plurality of openings extending between the top and bottom surfaces. The top surface receives a liquid which flows in a flow direction over the top surface. A plurality of valves is disposed over the openings. In an example, each valve can be a fixed valve. Each valve includes a round lid coupled to first, second, and third legs. The first leg is upstream of the second and third legs relative to the flow direction. The first leg has a width that is greater than the width of the second and third legs. In particular, a ratio of the width of the first leg to the width of the second leg is in a range of 1.6:1 to 2.6:1.

Such an exchange device can be used as part of a tray in a liquid-gas exchange system, such as distillation, exchange, or absorption columns. In an example, a liquid-gas exchange system or separation system includes the column with trays having a plurality of valves and optionally includes a boiler, a condenser, or a reflux container in fluid communication with the column.

In practice, a multicomponent stream can be fed to the column. As the liquid flows down the column from tray to tray and vapor or gas flows up through trays, components of the multicomponent stream concentrated either at the top or at the bottom of the column. A concentrated compound can be drawn from the column, for example, from the reflux container, the condenser, or from the boiler.

Figure 1:
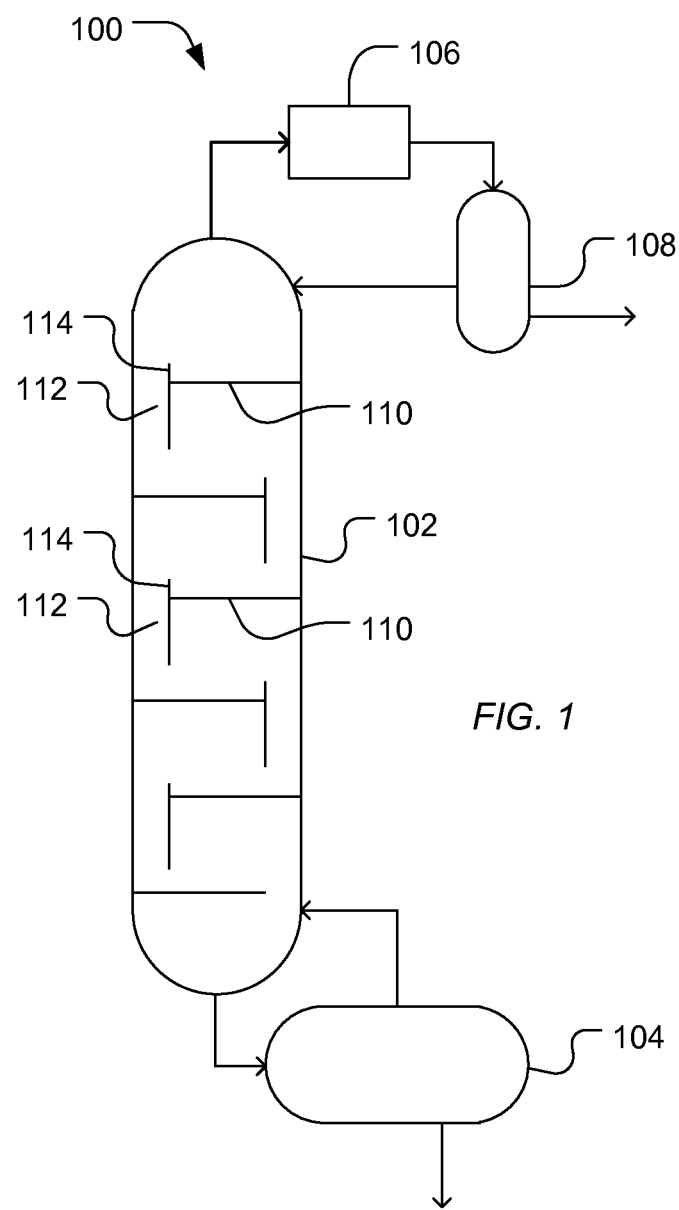
FIG. 1 includes an illustration of an exemplary separation column.

As illustrated in FIG. 1, a separation device 100 can include a column 102. The column 102 at the top can be in fluid communication with a condenser 106. In particular, vapor or gas from the column 102 flows to the condenser 106 to be condensed into a liquid which flows into a reflux container 108, and optionally, a portion of the reflux flows back to the column 102 as a liquid. The column 102, for example, can be in fluid communication with a boiler 104. For example, liquid flows from the bottom of the column 102 to the boiler 104 where at least a portion of the liquid is vaporized and returns to the column 102 as a gas or vapor.

The column 102 can include a plurality of trays 110. Each tray 110 can optionally include a downcomer 112 in which liquid flows from the tray to the receiving area of a lower tray. In further example, the tray 110 can also include a weir 114 that defines a liquid height for retaining liquid on the tray. Alternatively, the tray can be designed without a weir 114.

Each of the trays 110 can be formed from one or more plates that include openings and valves applied over the openings. For example, as illustrated in FIG. 2, FIG. 3, or FIG. 4, a plate 202 includes a top surface 204 and bottom surface 306. Openings 310 extend through the plate 202 from the bottom surface 306 to the top surface 204. Valves 208 are disposed over the openings 310. As illustrated, the valve 208 can include a lid 212 and three legs, such as legs 214, 216, and 420. In an example, a first leg 214 has a width greater than a width of the second leg 216 or the third leg 420. Each of the legs can include a tab 322 that extends through the opening 310 and is bent toward the bottom surface 306 of the plate 202. Optionally, the plate 202 includes a downcomer 418.

Figure 5:
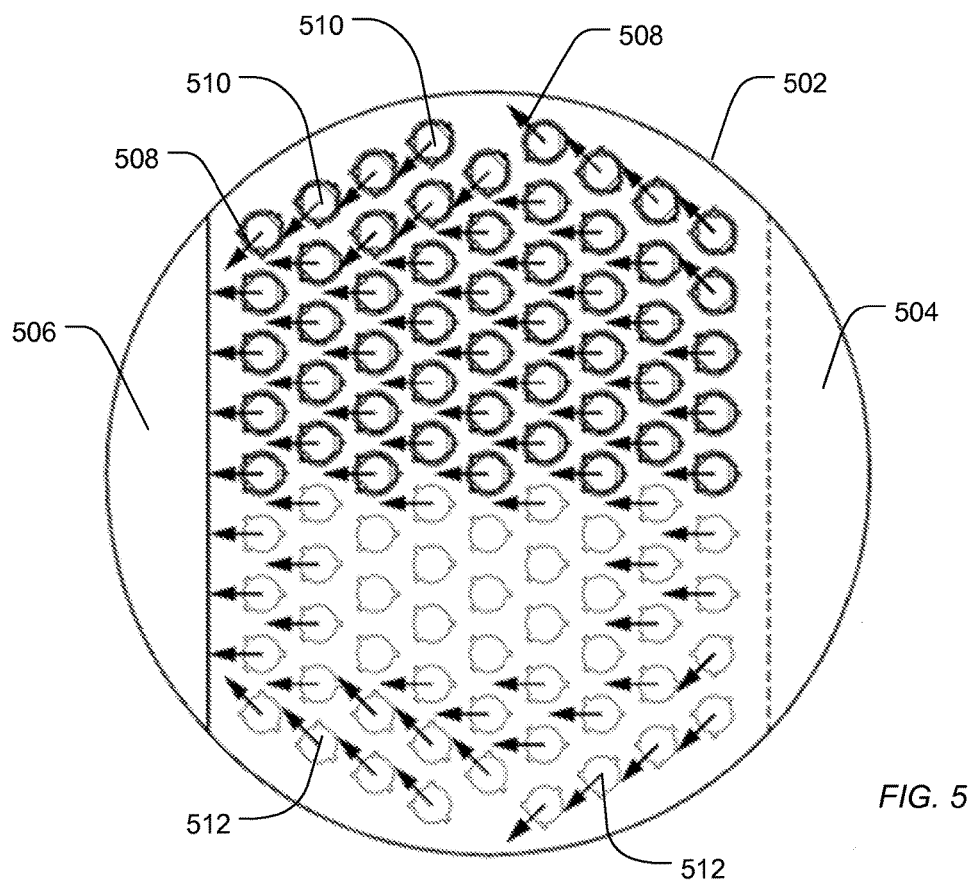

As illustrated in FIG. 5, liquid can be received in a receiving area 504 of the tray 502 and flow in a flow direction indicated by arrows 508 towards a downcomer 506. The valves 510 can be positioned or disposed over openings 512 in the tray 502. Optionally, the orientation of the valves 510 on the tray can be set based on an expected fluid flow direction at the position of the valve on the tray.

Figure 6:
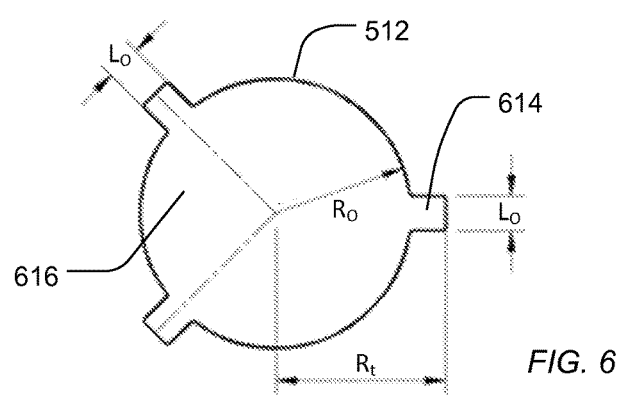
FIG. 6 includes an illustration of exemplary opening in an exchange device.

An exemplary opening 512 can include slots 614 for receiving tabs of the valves, as illustrated in FIG. 6. The slots 614 can have a width $L_O$ equal to or greater than the width of the tabs of the valves. In an example, the slots 614 can have a width $L_O$ in a range of 2 mm to 20 mm. For example, the width $L_O$ can be in a range of 3 mm to 15 mm, such as a range of 4 mm to 10 mm, or approximately 5 mm. The slots 614 can extend outwardly from a center point of the opening for a distance or radius $R_t$. For example, $R_t$ can be in a range of 10 mm to 100 mm, such as a range of 15 mm to 75 mm, a range of 20 mm to 50 mm, a range of 20 mm to 30 mm, such as a range of 22 mm to 28 mm, or approximately 24.5 mm.

As illustrated, the opening 512 can include a round open area 616 for the flow of gas from under the tray. The round area 616 can be circular in nature, ovular, or take various arcuate forms. In particular, the open area 616 can have a radius $R_O$ in a range of 10 mm to 75 mm, such as a range of 15 mm to 45 mm, a range of 15 mm to 30 mm, or even range of 15 mm to 20 mm, such as approximately 19.5 mm. A difference between the radius $R_t$ and the radius $R_O$ can be in a range of 2 mm to 10 mm, such as a range of 3 mm to 7 mm, or a range of 4 mm to 6 mm, such as approximately 5 mm. In a particular example, the open area 616 can be in a range of 1000 mm$^2$ to 1500 mm$^2$, such as a range of 1100 mm$^2$ to 1350 mm$^2$, or a range of 1200 mm$^2$ to 1300 mm$^2$, or approximately 1264 mm$^2$.

FIG. 7, FIG. 8, FIG. 9, FIG. 10, FIG. 11, and FIG. 12 include illustrations of an exemplary embodiment of a valve design. In particular, as illustrated in FIG. 7, a valve 700 is a fixed valve, meaning that it has no moving parts and remains in approximately the same position throughout the liquid-gas exchange process. Alternatively, the valve can include a valve plate (not illustrated) disposed within the volume between the lid and legs. The valve plate can rest over the tray or plate when vapor is not flowing and can rise as vapor pressure increases. The valve plate can have tabs or slots to guide the positioning of the valve plate.

The valve 700 includes a lid 702 attached to three legs 704, 706 and 812. The legs 704, 706 and 812 and the lid 702 can be formed using unitary construction, such as stamping from a sheet and bending into place. Alternatively, the legs 704, 706, and 812 can be attached, such as through welding or adhering to the lid 702. In particular, a sheet from which the valve 700 is formed can have a thickness ($T_C$ in FIG. 10) in a range of 0.5 mm to 5 mm, such as a range of 0.5 mm to 4 mm, a range of 1 mm to 3 mm, or a range of 1 mm to 2 mm, such as approximately 1.5 mm. The valve 700 can be formed from various metallurgies or plastic materials. In an example, the valve 700 can be formed from a metal, such as stainless steel, galvanized steel, aluminum, copper, titanium, or alloys thereof.

The first leg 704 can be positioned upstream of the second leg 706 and the third leg 812 when disposed on a plate or tray. The first leg 704 can be wider than the second leg 706 or the third leg 812. As illustrated in FIG. 9, the first leg 704 can have a width $W_F$ in a range of 10 mm to 50 mm, such as a range of 15 mm to 35 mm, a range of 15 mm to 25 mm, or a range of 16 mm to 20 mm, such as approximately 19 mm. A width $W_S$ of the second leg 706 can be in a range of 5 mm to 15 mm, such as a range of 6 mm to 10 mm, or a range of 7 mm to 9 mm, such as approximately 8.5 mm. A ratio of the width $W_F$ to the width $W_S$ can be in a range of 1.6:1 to 2.6:1. For example, the ratio can be in a range of 1.8:1 to 2.4:1, such as 1.9:1 to 2.3:1, or even 2.1:1 to 2.3:1. As illustrated in FIG. 9, a width of the third leg 812 can be substantially the same as that of the width of a second leg 706 ($W_S$). Alternatively, the width of the third leg 812 can be different than the width of the second leg 706.

As described above, the first leg 704 can be positioned upstream of the second or third legs (706 or 812). As illustrated in FIG. 9, a flow vector F extends through the front leg 704 and a center of the valve 702. The second and third legs (706 and 812) can be offset by an angle α from the flow vector F. In an example, the angle α is in a range of 20° to 65°. For example, the angle α can be in a range of 45° to 60°, such as a range of 35° to 55°, or even a range of 40° to 50°. In a particular example, the angle α is approximately 45°.

The lid 702 can be round. For example, the lid 702 can be circular, ovular, or have another arcuate shape. Further, the lid 702 can have a bent cross-section, as illustrated in FIG. 10. In an example, the edges of the lid 702 can be bent. For example, the edge portion 1016 of the lid 702 can be bent towards the opening, providing a concave surface when viewed from the opening. The edge portion 1016 can have a length $L_W$ in a range of 2 mm to 10 mm, such as a range of 3 mm to 7 mm, or approximately 5 mm. The edge portion 1016 can be bent at an angle β, relative to the horizontal, having a range of 15° to 70°, such as a range of 20° to 55°, or a range of 40° to 50°, such as approximately 45°. As such, the lid 702 can have a cross-sectional width ($W_C$), resulting from the bend of the edge portions 1016, in a range of 2 mm to 10 mm, such as a range of 3 mm to 7 mm, or a range of 4 mm to 6 mm, such as approximately 5.1 mm.

As illustrated in FIG. 7 and FIG. 8, each of the legs 704, 706 and 812 can include a tab 708, 710, or 814. The tab 708, 710, or 814 extends from a bottom extent of the legs (704, 706, or 812) and through the opening in the plate or tray. In an example, the legs (704, 706, or 812) can rest on a top surface of the tray and the tabs (708, 710 or 814) can extend through the tray and be bent toward a bottom surface of the tray. As illustrated in FIG. 11, the tabs can have a width $W_T$ in a range of 3 mm to 15 mm, such as a range of 4 mm to 10 mm, or approximately 4.5 mm. Further, the tabs can have a length $L_T$ in a range of 3 mm to 15 mm, such as a range of 5 mm to 10 mm, or a range of 6 mm to 8 mm, such as approximately 7 mm.

Tabs 708, 710, or 814 can extend through the plate or tray deck, as illustrated in FIG. 12, and can be bent towards the bottom surface of the tray deck to an angle γ. In an example, the angle γ can have a range of 5° to 50°, such as a range of 15° to 45°, a range of 25° to 35°, or approximately 30°.

As a result, the valve lid 702 can be disposed a distance $D_v$ of the trade deck. In an example, $D_v$ is in a range of 5 mm to 50 mm, such as a range of 5 mm to 40 mm, a range of 6 mm to 25mm, a range of 10 mm to 25 mm, a range of 12 mm to 20 mm, or a range of 14 mm to 18 mm, such as approximately 16 mm. In general, the distance $D_v$ can be varied by changing the length of the legs 704, 706, or 812. As illustrated, the legs 704, 706, 812 can be approximately of equal length. Alternatively, the legs can be of different length. For example, the first leg 704 can be shorter than a second leg 706 or a third leg 812. In another example, the second and third legs 706 or 812 can be shorter than the first leg 704.

The lid 702 has a radius $R_c$, as illustrated in FIG. 12, in a range of 10 mm to 100 mm, such as a range of 15 mm to 75 mm, a range of 20 mm to 50 mm, a range of 20 mm to 30 mm, or a range of 22 mm to 28 mm, such as approximately 24 mm. The lid 702 can also have a diameter $D_C$ equal to twice the $R_C$ of approximately 20 mm to 200 mm, such as a range of 30 mm to 150 mm, a range of 40 mm to 100 mm, a range of 40 mm to 60 mm, such as a range of 44 mm to 56 mm, or approximately 48 mm.

As illustrated, the lid 702 does not include additional openings and forms a continuous piece without perforations that permit the passage of gas through the lid 702. Alternatively, the lid can include perforations.

An escape area in which gas or vapor passes through the area defined along the periphery of the valve between the valve lid 702 and the plate or tray deck is determined based on the radius Re of the lid 702, the distance $D_v$, and the width of the legs. The escape area can be in a range of 1000 mm$^2$ to 2000 mm$^2$, such as a range of 1200 mm$^2$ to 1800 mm$^2$, a range of 1350 mm$^2$ to 1650 mm$^2$, or a range of 1400 mm$^2$ to 1550 mm$^2$, such as approximately 1450 mm$^2$ In a particular example, an escape ratio of the escape area to the open area is in a range of 0.75:1 to 2:1. For example, the escape ratio can be in a range of 1:1 to 1.8:1, such as a range of 1.1:1.8:1, a range of 1.1:1 to 1.6:1 or even a range of 1.1:1 to 1.3:1.

In a first aspect, an exchange device includes a plate having a top surface and a bottom surface, the plate defining a plurality of openings extending between the top and bottom surfaces, the top surface to receive a liquid to flow in a flow direction over the top surface; a plurality of valves, each valve of the plurality of valves disposed over an opening of the plurality of openings, each valve including a round lid coupled to first, second and third legs, the first leg upstream of the second and third legs relative to the flow direction, the first leg having a first width and the second leg having a second width, a ratio of the first width to the second width in a range of 1.6:1 to 2.6:1.

In an example of the first aspect, the ratio of the first width to the second width is in a range of 1.8:1 to 2.4:1. For example, the ratio of the first width to the second width can be in a range of 1.9:1 to 2.3:1. In a further example, the ratio of the first width to the second width is in a range of 2.1:1 to 2.3:1.

In another example of the first aspect and the above examples, the third leg has a third width substantially the same as the second width.

In a further example of the first aspect and the above examples, an axis parallel to the direction of flow extends through the first leg, the second and third legs offset from the axis on opposite sides by an angle in a range of 20° to 65°. For example, the angle can be in a range of 25° to 60°. In another example, the angle is in a range of 35° to 55°. In a further example, the angle is in a range of 40° to 50°.

In an additional example of the first aspect and the above examples, the round lid is disposed at a distance above the top surface in a range of 6 mm to 25 mm. For example, the distance can be in a range of 10 mm to 25 mm. In another example, the distance is in a range of 12 mm to 20 mm. In a further example, the distance is in a range of 14 mm to 18 mm.

In another example of the first aspect and the above examples, the round lid is circular.

In a further example of the first aspect and the above examples, the valve defines an escape area and an opening of the plurality of openings defines an open area, an escape ratio of the escape area to the open area is in a range of 0.75:1 to 2:1. For example, the escape ratio can be in a range of 1:1 to 2:1. In an example, the escape ratio is in a range of 1.1:1 to 1.8:1. In a further example, the escape ratio is in a range of 1.1:1 to 1.6:1. In another example, the escape ratio is in a range of 1.1:1 to 1.3:1.

In an additional example of the first aspect and the above examples, each leg includes a tab, the tab extending through the opening and bent toward the bottom surface of the plate.

In another example of the first aspect and the above examples, the exchange device further includes a downcomer to receive liquid from the top surface of the plate.

In a further example of the first aspect and the above examples, the exchange device further includes a weir.

In an additional example of the first aspect and the above examples, the plurality of valves includes fixed valves.

In a second aspect, a separation device includes a column and a set of trays disposed within the column. Each tray includes the exchange device of the first aspect or any of the above examples.

In an example of the second aspect, the separation device further includes a boiler in fluid communication with the column.

In another example of the second aspect and the above examples, the separation device further includes a condenser in fluid communication with the column.

In a further example of the second aspect and the above examples, the separation device further includes a reflux container in fluid communication with the column.

In a third aspect, a method of preparing a composition includes performing a liquid/gas separation using the separation device of the second aspect or any of the above examples.

Embodiments of the valves and trays and columns using such valves provide technical advantages when separating components from a multi-component stream. For example, embodiments provide improved liquid-gas contact area or bubble formation, reduced weep through the openings, low foam, or a desirably low pressure drop across trays relative to other designs.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An exchange device comprising:
a plate having a top surface and a bottom surface, the plate defining a plurality of openings extending between the top and bottom surfaces, the top surface to receive a liquid to flow in a flow direction over the top surface;
a plurality of valves, each valve of the plurality of valves disposed over an opening of the plurality of openings, each valve including a round lid coupled to first, second and third legs, the first leg upstream of the second and third legs relative to the flow direction, the first leg having a first width and the second leg having a second width, a ratio of the first width to the second width in a range of 1.6:1 to 2.6:1.

2. The exchange device of claim 1, wherein the ratio of the first width to the second width is in a range of 1.8:1 to 2.4:1.

3. The exchange device of claim 2, wherein the ratio of the first width to the second width is in a range of 1.9:1 to 2.3:1.

4. The exchange device of claim 1, wherein the third leg has a third width substantially the same as the second width.

5. The exchange device of claim 1, wherein an axis parallel to the direction of flow extends through the first leg, the second and third legs offset from the axis on opposite sides by an angle in a range of 20° to 65°.

6. The exchange device of claim 5, wherein the angle is in a range of 25° to 60°.

7. The exchange device of claim 1, wherein the round lid is disposed at a distance above the top surface in a range of 6 mm to 25 mm.

8. The exchange device of claim 7, wherein the distance is in a range of 10 mm to 25 mm.

9. The exchange device of claim 1, wherein the round lid is circular.

10. The exchange device of claim 1, wherein the valve defines an escape area and an opening of the plurality of openings defines an open area, an escape ratio of the escape area to the open area is in a range of 0.75:1 to 2:1.

11. The exchange device of claim 10, wherein the escape ratio is in a range of 1:1 to 2:1.

12. The exchange device of claim 1, wherein each leg includes a tab, the tab extending through the opening and bent toward the bottom surface of the plate.

13. The exchange device of claim 1, further comprising a downcomer to receive liquid from the top surface of the plate.

14. The exchange device of claim 1, further comprising a weir, wherein the weir is attached to the plate.

15. The exchange device of claim 1, wherein the plurality of valves includes fixed valves.

16. A separation device comprising:
a column; and
a set of trays disposed within the column, each tray comprising:
a plate having a top surface and a bottom surface, the plate defining a plurality of openings extending between the top and bottom surfaces, the top surface to receive a liquid to flow in a flow direction over the top surface;
a plurality of valves, each valve of the plurality of valves disposed over an opening of the plurality of openings, each valve including a round lid coupled to first, second and third legs, the first leg upstream of the second and third legs relative to the flow direction, the first leg having a first width and the second leg having a second width, a ratio of the first width to the second width in a range of 1.6:1 to 2.6:1.

17. The separation device of claim 16, further comprising a boiler in fluid communication with the column.

18. The separation device of claim 16, further comprising a condenser in fluid communication with the column.

19. The separation device of claim 16, further comprising a reflux container in fluid communication with the column.

20. A method of preparing a composition, the method comprising:
feeding a feedstock to a separation device; and
separating said feedstock into gas and liquid fractions using a separation device, said separation device comprising:
a column; and
a set of trays disposed within the column, each tray comprising:
a plate having a top surface and a bottom surface, the plate defining a plurality of openings extending between the top and bottom surfaces, the top surface to receive a liquid to flow in a flow direction over the top surface;
a plurality of valves, each valve of the plurality of valves disposed over an opening of the plurality of openings, each valve including a round lid coupled to first, second and third legs, the first leg upstream of the second and third legs relative to the flow direction, the first leg having a first width and the second leg having a second width, a ratio of the first width to the second width in a range of 1.6:1 to 2.6:1.

* * * * *